US007143841B2

(12) United States Patent
Etter et al.

(10) Patent No.: US 7,143,841 B2
(45) Date of Patent: Dec. 5, 2006

(54) BELT CLIP FOR HAND-HELD POWER TOOLS

(75) Inventors: Mark Alan Etter, Jackson, TN (US); Daniel Paxton Wall, Jackson, TN (US); Alan Gene Phillips, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 3 days.

(21) Appl. No.: 10/773,252

(22) Filed: Feb. 9, 2004

(65) Prior Publication Data

US 2004/0206522 A1 Oct. 21, 2004

Related U.S. Application Data

(63) Continuation-in-part of application No. 09/972,980, filed on Oct. 10, 2001, now Pat. No. 6,688,407.

(51) Int. Cl.
*B23B 45/14* (2006.01)

(52) U.S. Cl. ......................... 173/170; 173/171; 24/457

(58) Field of Classification Search ................ 173/170, 173/171; 224/269, 929; 24/457
See application file for complete search history.

(56) References Cited

U.S. PATENT DOCUMENTS 2,320,450 A 6/1943 Valenzuela
4,677,362 A 6/1987 House et al.
D293,201 S 12/1987 House et al.
D297,608 S 9/1988 House et al.
4,956,895 A * 9/1990 Hayasaka .................... 24/3.11
4,974,764 A 12/1990 Cantwell
5,224,230 A 7/1993 Vanicsek et al.
D345,465 S * 3/1994 Greig ........................... D8/70
5,372,206 A 12/1994 Sasaki et al.
5,531,365 A 7/1996 Donnelly
5,743,451 A 4/1998 Kahn
5,810,232 A 9/1998 Meurer et al.
5,850,698 A 12/1998 Hurn et al.
6,010,103 A 1/2000 Ashworth
6,227,308 B1 5/2001 Ghode et al.
6,321,418 B1 11/2001 Halleck
6,325,577 B1 12/2001 Anderson
D452,639 S 1/2002 Zurwelle (Continued)

FOREIGN PATENT DOCUMENTS

DE 41 17 565 * 3/1992

OTHER PUBLICATIONS

Hitachi Drywall Screwdriver Model W6V2 and W6VA2 Instruction Manual, 11 pages (accompanied by Hitachi list of discontinued tools which indicates that model W6V2 and model W6V2A were each discontinued in 2000).

(Continued)

*Primary Examiner*—Scott A. Smith
*Assistant Examiner*—Gloria R. Weeks
(74) *Attorney, Agent, or Firm*—Hunton & Williams

(57) ABSTRACT

A power tool, such as a drill/driver or a reciprocating saw, can be provided with a belt clip which attaches to the tool at multiple positions to adapt to the user's preference. The belt clip can be side-mounted to a drill/driver to facilitate holstering of the drill/driver and to reduce the profile of the drill/driver. The side-mounted belt clip can be positioned to enable the drill/driver to be grasped in the ergonomically desirable thumb-rest and power-grip holds. The belt clip can be adapted to facilitate the wielding of the tool by providing additional surfaces for the fingers and thumb to contact when grasping the tool.

32 Claims, 13 Drawing Sheets

U.S. PATENT DOCUMENTS

| | | | | |
|---|---|---|---|---|
| 6,454,147 | B1 | 9/2002 | Marks | |
| 6,490,186 | B1 | 12/2002 | Cho | |
| D475,596 | S | 6/2003 | Ozawa et al. | |
| 6,578,745 | B1 | 6/2003 | Taylor et al. | |
| D477,205 | S | 7/2003 | Sakai et al. | |
| 6,612,476 | B1 * | 9/2003 | Smolinski | 227/120 |
| 6,860,342 | B1 * | 3/2005 | Wu et al. | 173/217 |
| 2002/0122707 | A1 | 9/2002 | Sakai et al. | |
| 2002/0179659 | A1 * | 12/2002 | Shaw | 224/269 |
| 2003/0159251 | A1 * | 8/2003 | Robinson | 16/431 |

OTHER PUBLICATIONS

Hitachi Power Tools press release, "The New Hitachi Cordless Impact Series is sure to Knock Your Sockets Off," Jan. 30, 2002, 3 pages.

Hitachi WH12DM and WH9DM Safety Instructions and Instruction Manual, 76 pages.

Makita 6952—Impact Driver, <www.makita.com/tools_item_view.asp?id=751>, printed on Dec. 17, 2003, 3 pages.

Makita Model 6952 Impact Driver Instruction Manual, 16 pages.

Makita Model TW0200 Impact Wrench Instruction Manual, 16 pages.

Makita Model TW0200 Impact Wrench Parts Breakdown and Parts List, 2 pages.

Makita TW0200—½" Drive Impact Wrench, <www.makita.com/tools_item_view.asp?id=753>, printed on Dec. 17, 2003, 3 pages.

Milwaukee 0602-20 and 0612-20 Operator's Manual, 36 pages.

Milwaukee Electric Tool press release, "New 12 and 14.4 Volt Driver/Drills Are Compact in Size, Big in Performance," Sep. 3, 2003, 2 pages.

Senco Duraspin Screw Fastening Systems, Model DS162-14V, <www.duraspin.com/tool_ds162_14v.html>, printed on Jun. 25, 2001.

DeWalt DW378 circular saw instruction manual, 2000, 32 pages.

DeWalt DW378 circular saw parts diagram, 4 pages.

* cited by examiner

BELT CLIP FOR HAND-HELD POWER TOOLS

This application is a continuation-in-part of U.S. patent application Ser. No. 09/972,980 filed Oct. 10, 2001 (now U.S. Pat. No. 6,688,407, issued Feb. 10, 2004).

BACKGROUND OF THE INVENTION

This invention relates generally to belt clips for hand-held power tools.

Belt clips mounted on the top surface of a drill/driver housing are known in the art and are substantially flat, elongated members that extend substantially parallel to the top surface of the tool housing, at a height just slightly elevated from the top surface of the housing. In U.S. Pat. No. 5,372,206, for example, a hand-held, motor-driven tightening tool is illustrated having a belt clip. The belt clip is integrally formed with the top surface of the tool housing. Belt clips on other hand-held power tools are also known.

A prior art hand-held drill/driver 100 having a belt clip 110 is schematically illustrated in FIG. 1. The belt clip 110 is formed as an integral part of the housing 104 of the drill/driver 100. Like many belt clips known in the art, belt clip 110 has a substantially flat elongated portion 112 extending parallel to the top surface 106 of the tool housing 104. The flat, elongated portion 112 is slightly elevated from top surface 106 so as to form a receiving space 108 therebetween.

Belt clip 110 enables the user to secure the drill/driver 100 or other tool to a tool belt, pants pocket, or other suitable receiving means. As a result, a user can temporarily store the tool in a convenient location to allow the user to use both hands for a task, or to rapidly switch to another tool. A user on a ladder, for example, does not have to interrupt work in order to climb down the ladder to replace or retrieve a tool.

Despite providing a convenient means to carry hand-held power tools, conventional belt clips on the top surface of a tool housing do not enhance the performance of the tool while it is being operated by the user. Conventional belt clips do not do anything to facilitate wielding or holding the drill/driver. In fact, conventional belt clips are typically positioned on hand-held power tools so that the user does not contact or interact in any other way with the belt clip while the tool is in use.

Furthermore, when the belt clip is positioned on the top surface of the housing of a drill/driver, as in U.S. Pat. No. 5,372,206, attaching the belt clip to a tool belt or receiving means causes the pistol grip portion of the drill/driver to extend substantially perpendicular with respect to the receiving surface. For example, if the power tool in U.S. Pat. No. 5,372,206 is attached to a tool belt at a position corresponding with the user's hip, the profile of the tool extending from the tool belt is at a maximum. The user's hand and forearm may inconveniently contact the pistol grip as the user searches for and retrieves other tools and implements from the tool belt.

Having the belt clip positioned on the top surface of a drill/driver causes the drill/driver to be holstered to the user's tool belt or other receiving means in a configuration which is not ergonomically desirable. For example, in order for the user to holster the drill/driver to a tool belt or other receiving means on the front portion of a user's pants, the user must rotate their arm and wrist into an uncomfortable and unconventional position.

These and other drawbacks of the prior art are overcome by the belt clip and drill/driver of the preferred embodiments of the invention.

In addition to their use with a drill/driver, the belt clip, attaching means, and other features are also useful with a reciprocating saw.

DETAILED DESCRIPTION

Figure 8:
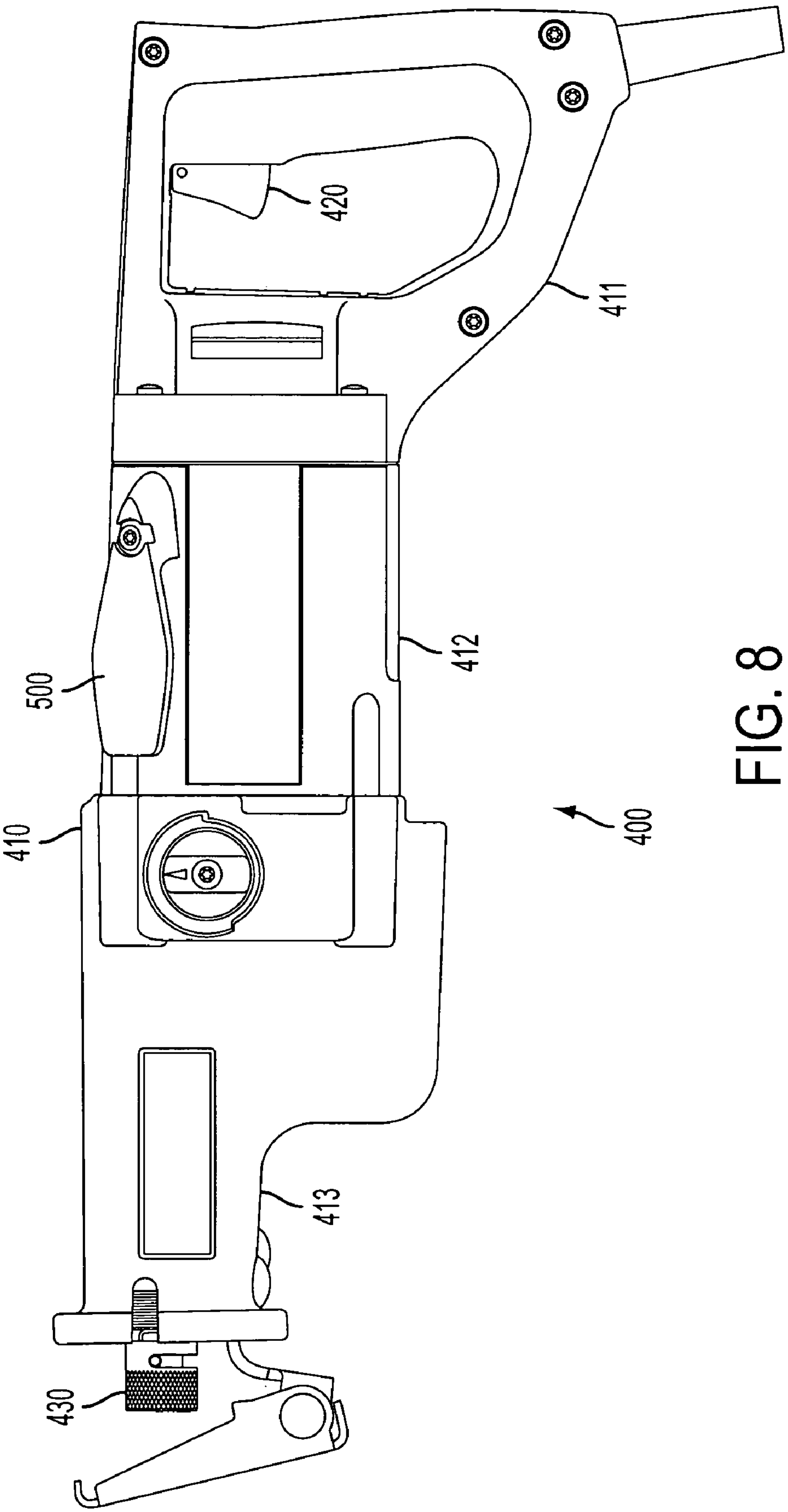
FIG. 8 is a side view of a reciprocating saw with a belt clip mounted thereto.
Figure 9:
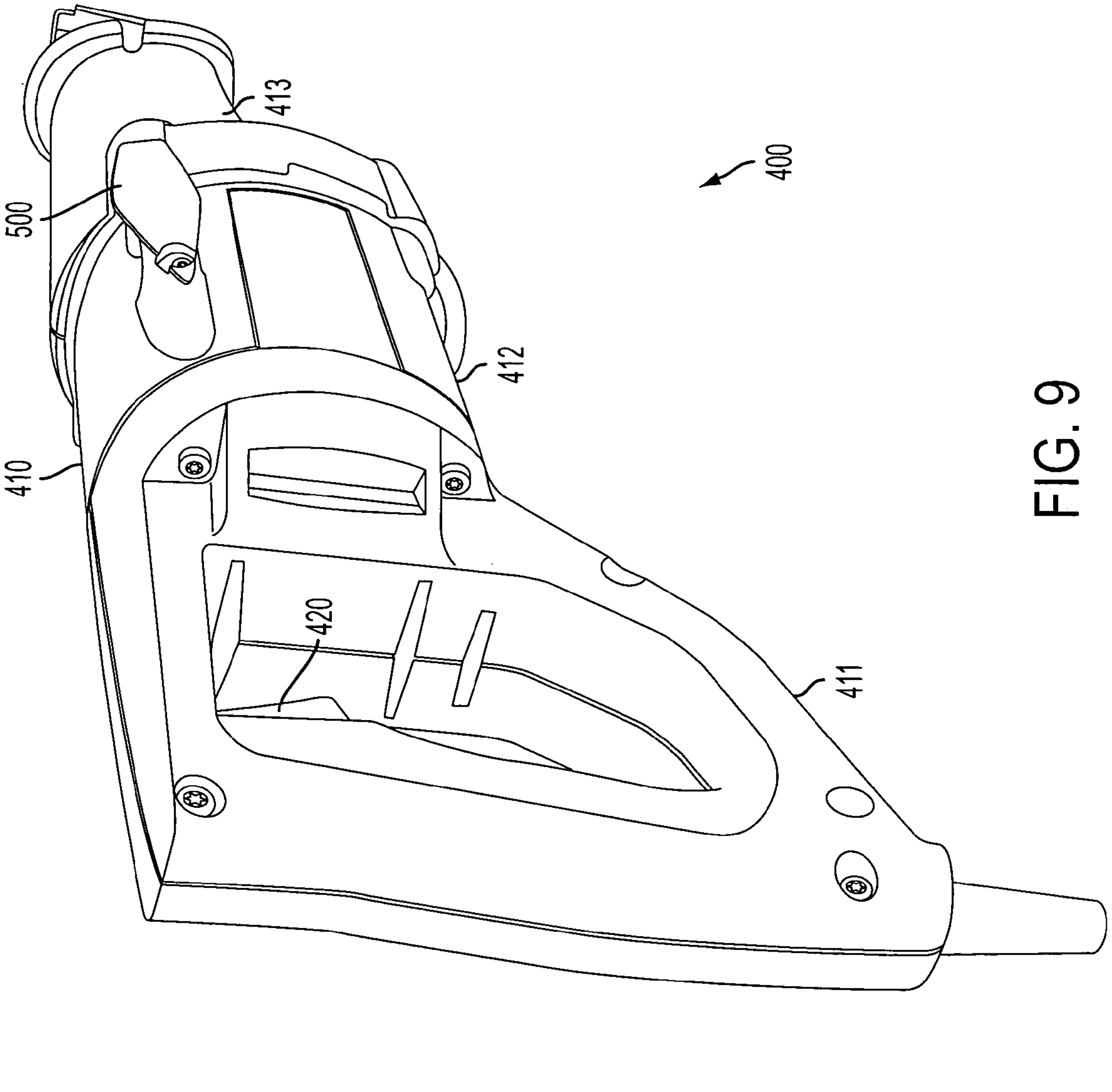
FIG. 9 is an isometric view of the reciprocating saw of FIG. 8 with the belt clip mounted on the opposite side thereof.

For convenience in describing the preferred embodiments, the belt clip will first be described as a belt clip on a drill/driver. It will be understood, however, that the belt clip is not limited to use with a drill/driver, as it can be advantageously incorporated into other hand-held power tools in a similar manner. For example, the belt clip and features of the belt clip can be incorporated on and used with a reciprocating saw, as shown in FIGS. 8 and 9.

Also, the term drill/driver shall be construed herein to encompass the entire range of hand-held drills and power screwdrivers and other similar tools which have the same basic shape as the drill/driver illustrated in the figures.

FIGS. 2A–2F illustrate the belt clip mounted on a drill/driver 300. Drill/driver 300 has a housing with a barrel portion 310 and a pistol grip portion 320. The barrel portion 310 at least partially encloses the rotary motor (not shown) which powers the drill/driver 300. The barrel portion 310 further comprises a first side portion 311, a second side portion 312, a top side portion 313, a bottom side portion 314, a front side portion 315, and a back side portion 316. The first and second side portions 311, 312 generally oppose one another on the housing, as do the top side portion 313 and bottom side portion 314, and the front side portion 315 and back side portion 316. A drill chuck or screwdriver clutch and nosepiece assembly, if provided, extend from the front side portion 315. The pistol grip portion 320 extends away from the barrel portion 310 at the bottom side portion 314. The pistol grip portion 320 is typically angled with respect to the barrel portion 310 for comfort. The pistol grip portion 320 mounts a trigger switch 321. The pistol grip portion 320 also typically has a battery or power cord 322 extending from the distal end thereof.

Figure 2A:
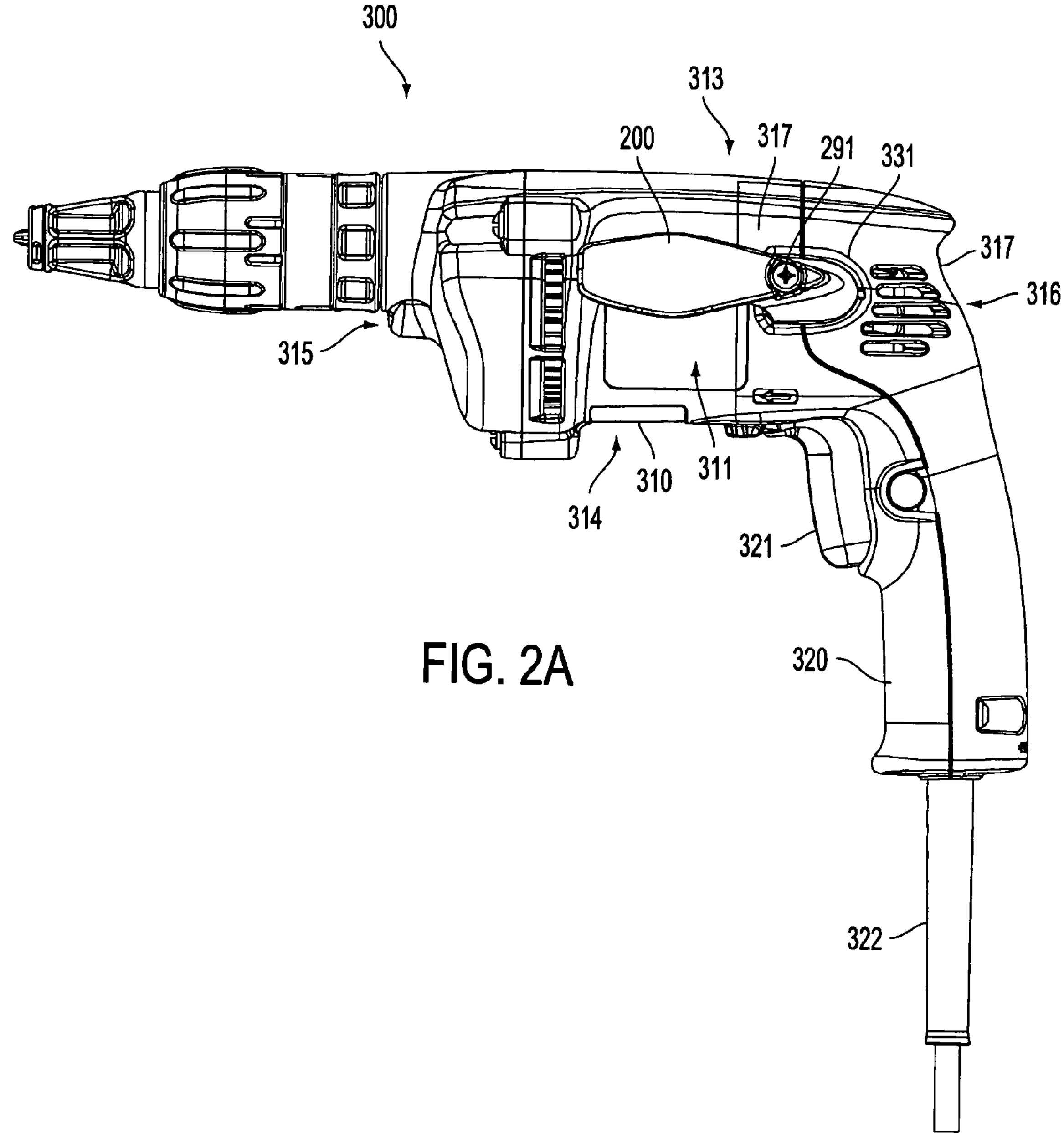
FIGS. 2A, 2B, and 2C are side, top, and isometric views, respectively, of the belt clip mounted to the side of a drill/driver according to a first preferred embodiment.
Figure 2B:
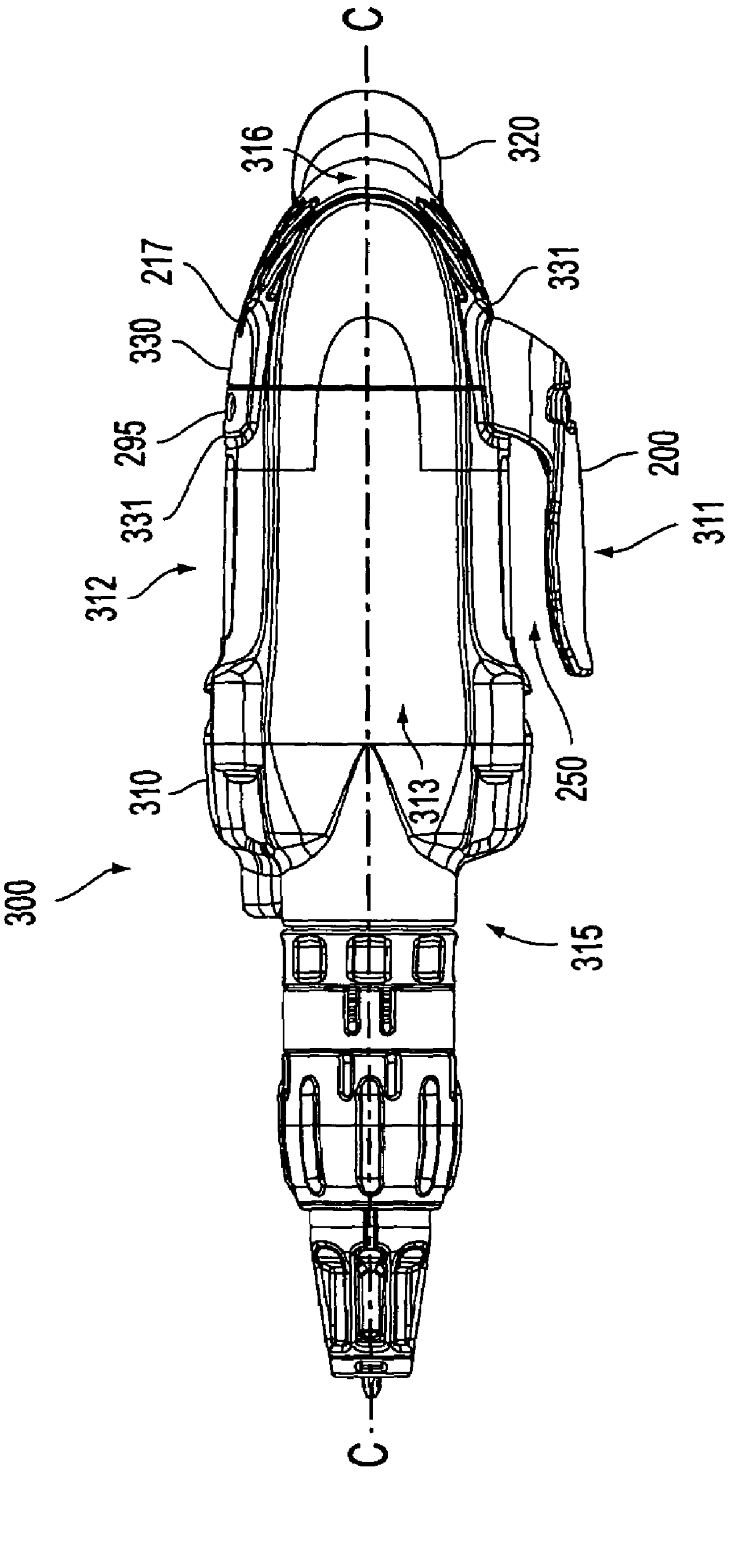
Figure 2C:
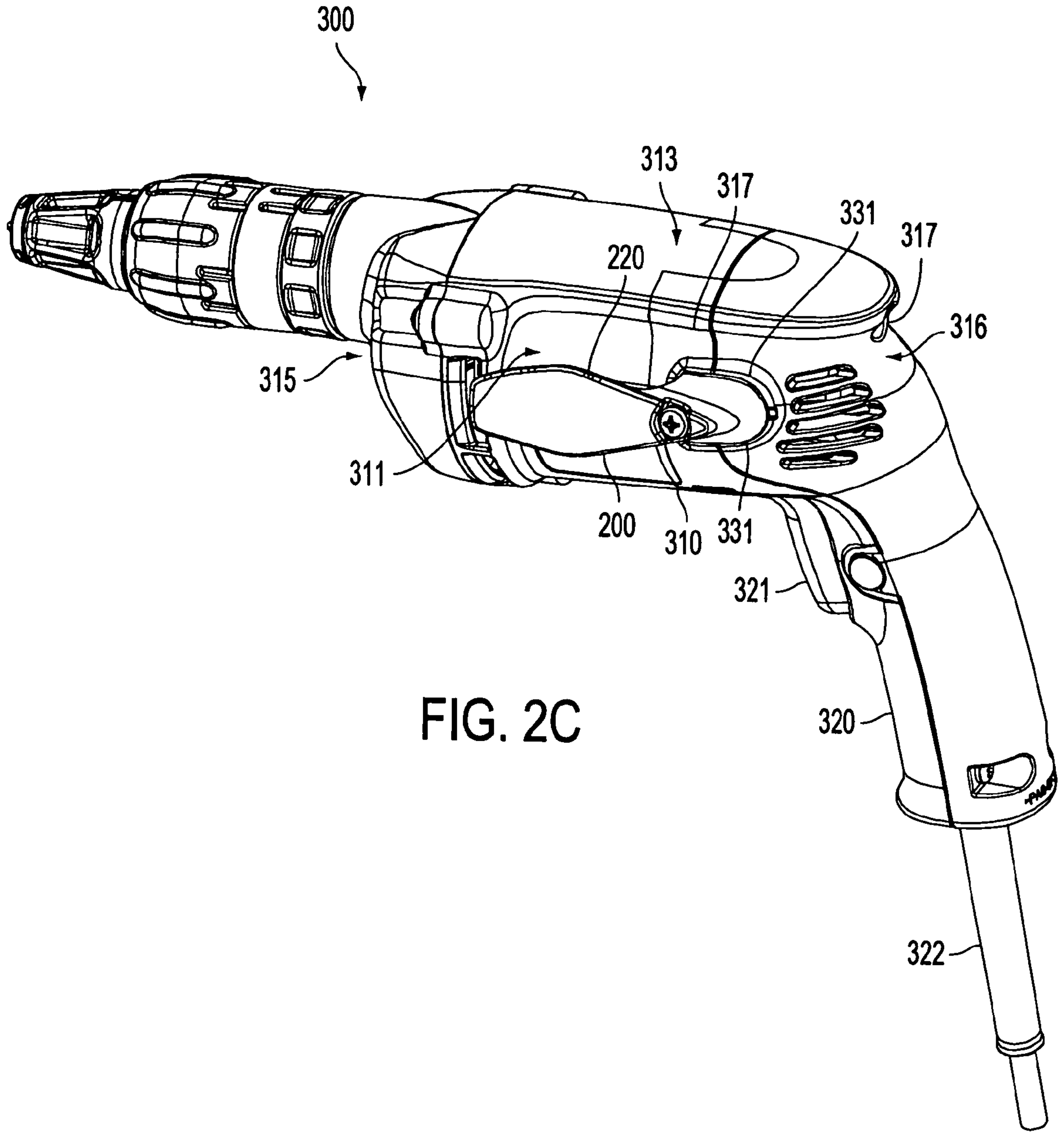

As seen in FIGS. 2A–2C, the belt clip 200 may be mounted to the first side portion 311 of the drill/driver 300. As seen in FIG. 2B, a receiving space 250 is formed between the belt clip 200 and the first side portion 311. A tool belt, belt loop, pants pocket, or other accommodating surface can be received in receiving space 250 to secure the drill/driver 300 to the user's belt, clothing or the like. The belt clip 200 may also likewise be mounted to the second side portion 312 of the drill/driver 300. A belt clip 200 mounted to either the first side portion 311 or the second side portion 312 of the drill/driver 300 will be referred to hereinafter as a side-mounted belt clip.

With a side-mounted belt clip, the profile of the drill/driver 300 is significantly reduced when it is holstered to a receiving surface. This is due to the fact that the longitudinal plane of the receiving space 250 is generally parallel to the plane through which the pistol grip portion 320 extends away from the barrel portion 310. Thus, the pistol grip portion 320 extends generally tangentially from the user's waist or other receiving surface, instead of radially as occurs with a top-mounted belt clip. As a result of this reduced profile when holstered, the user's wrist or arm will be less likely to inadvertently bump into the drill/driver 300, and the drill/driver 300 will be less likely to inadvertently bump into obstacles. When a power cord 322 extends from the distal end of the pistol grip portion 320, it is likewise more advantageous to have a side-mounted belt clip than a top-mounted belt clip. When a drill/driver with a side-mounted belt clip is holstered, the power cord 322 will extend generally tangentially to the user's waist instead of radially.

A side-mounted belt clip also facilitates holstering and un-holstering the drill/driver 300 from the user's tool belt or the like. With a side-mounted belt clip, the user is not required to rotate his or her hand and arm excessively when holstering the drill/driver 300, as the case may be with a top-mounted belt clip.

Figure 1:
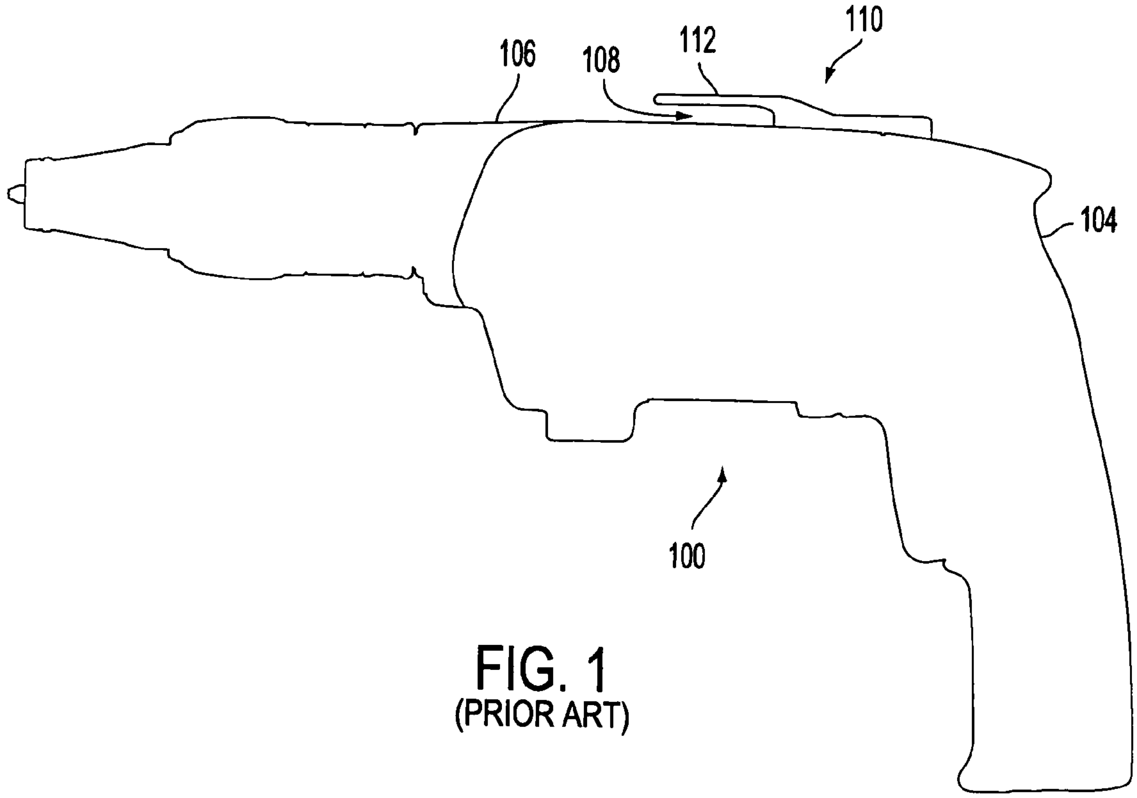
FIG. 1 (PRIOR ART)
FIG. 1 is a schematic illustration of a prior art hand-held drill/driver having a top-mounted belt clip.

Also, a side-mounted belt clip 200 on the drill/driver 300 allows the drill/driver 300 to be operated in tighter locations where obstacles obstruct access to the workpiece. As shown in FIGS. 2A and 2B, the rotational axis of the screwdriver bit is closer to the top portion 313 of the barrel portion 310 than either of the two side portions 311 or 312. Thus the effective profile of the drill/driver 300 is minimized when the top portion 313 abuts the obstacle. For example, when driving a screw into drywall where two walls meet in the corner of a room, the top of the drill can be placed against one wall while driving the screw into the edge of the other wall near the corner. This will allow the screw to be driven into the other wall as near as possible to the corner. However, when a belt clip is top-mounted in the manner shown in FIG. 1, this minimum profile is increased because the top-mounted belt clip is interposed between the top portion 313 and the obstacle. When a belt clip is side-mounted, the minimum profile from the rotational axis of the screwdriver bit to the top portion 313 is retained.

Figure 3:
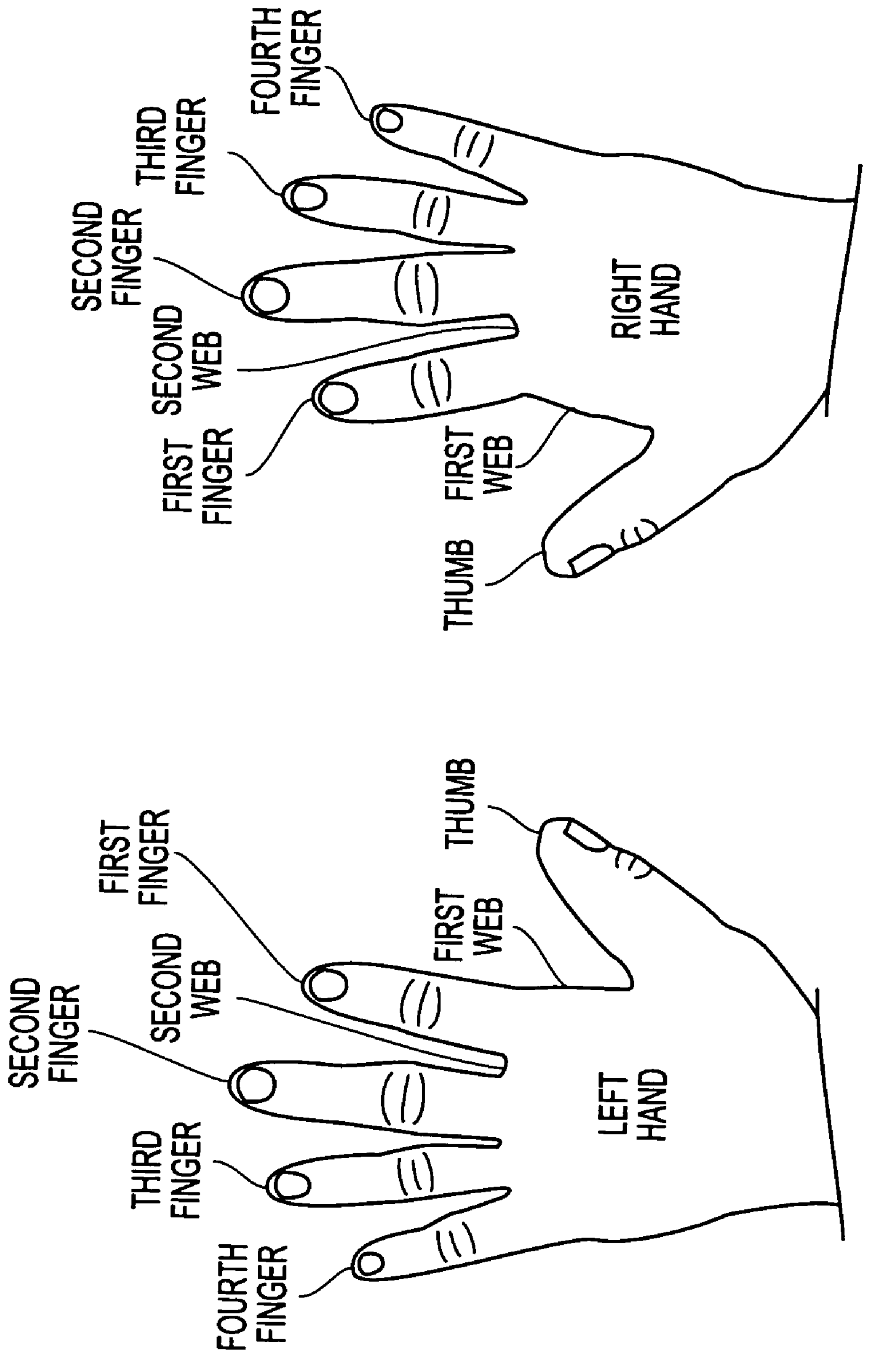
FIG. 3 is an illustration of a user's hands showing the nomenclature of the fingers and other parts of the hand as used herein.

Besides the advantages of a smaller profile when holstered and facilitated holstering and un-holstering of the drill/driver 300, the side-mounted belt clip can also provide very significant ergonomic advantages in the wielding of the drill/driver 300. With reference to FIG. 3, a user's left and right hand are illustrated and the nomenclature used to describe each of the user's fingers and other parts of the hand is illustrated. Each hand is labeled with a thumb and first, second, third, and fourth fingers. Also, the flesh between each thumb and first finger is labeled a first web, while the flesh between each first finger and second finger is labeled a second web. This nomenclature of FIG. 3 will be used hereinafter to make reference to the position of the user's fingers and other parts of the hand while wielding the drill/driver 300.

Figure 4A:
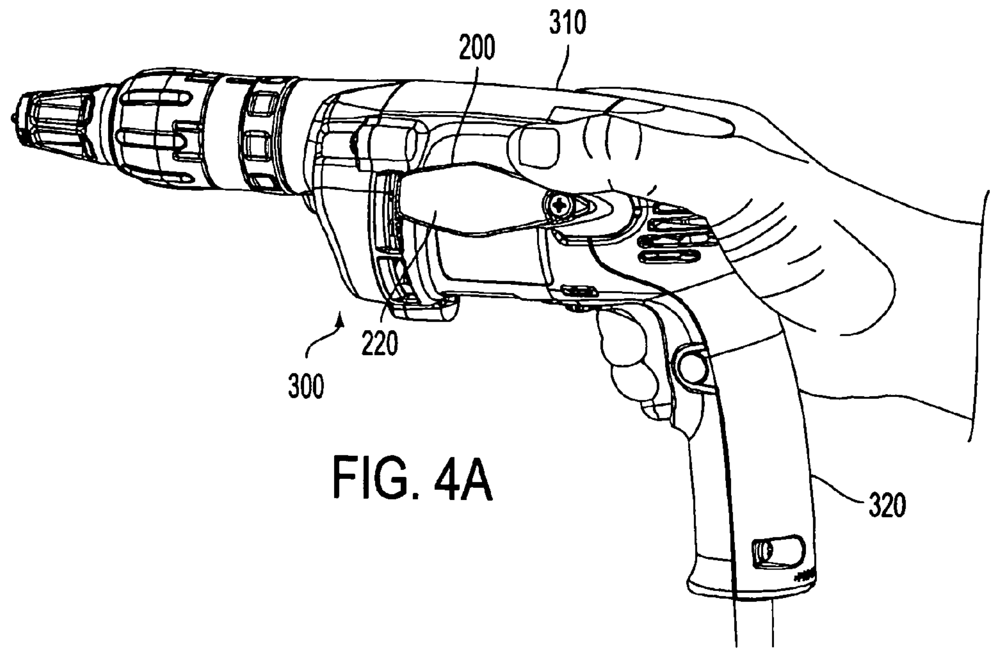
FIGS. 4A and 4B are isometric views of the drill/driver with the side-mounted belt clip grasped in the thumb-rest hold.
Figure 4B:
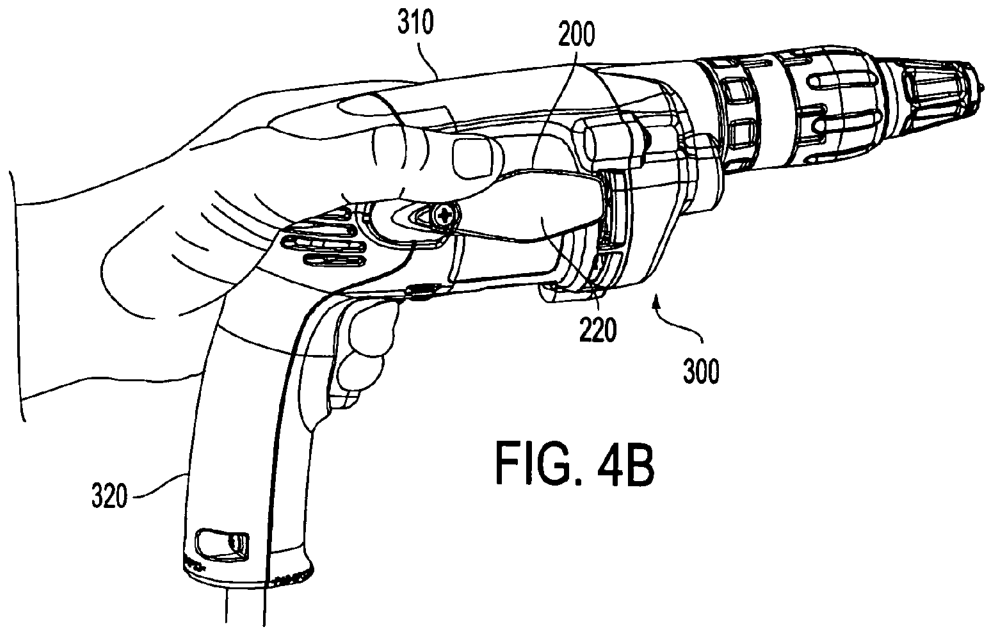

If desired, the side-mounted belt clip may be positioned to enable a thumb-rest hold illustrated in FIGS. 4A and 4B. In FIG. 4A, the belt clip 200 is side-mounted to the first side portion 311 of the drill/driver 300. In FIG. 4B, the belt clip 200 is side-mounted to the second side portion 312 of the drill/driver 300. In either configuration illustrated in FIG. 4A or 4B, the user is able to grasp the drill/driver 300 with a single hand in the thumb-rest hold. In the thumb-rest hold, the user's thumb of the hand that is grasping the drill/driver 300 is positioned in contact with both the belt clip 200 and one of the side portions 311 or 312. The remaining fingers are positioned in contact with either the other of the side portions 311 or 312 or the pistol grip portion 320. At least one of the remaining fingers is in contact with the pistol grip portion 320 and can actuate the trigger switch 321. Specifically, in FIGS. 4A and 4B, the first and second fingers are in contact with the first or second side portions 311 or 312, and the third and fourth fingers are in contact with the pistol grip portion 320 and can actuate the trigger switch 321.

As can be seen in FIGS. 4A and 4B, in the thumb-rest hold the belt clip 200 and the side portions 311 or 312 cradle the user's thumb. Cradling of the thumb means that there is substantial surface contact along the sides of the thumb in addition to the surface contact on the bottom of the thumb. The cradling of the thumb in this manner is an important ergonomic advantage.

In order to wield the drill/driver 300, the user must transfer forces from his fingers and hand to the surfaces of the housing. In order to transfer certain forces to the drill/driver 300, the user must first squeeze with the fingers in order to develop friction between the fingers and the housing. The friction is then used to transfer forces laterally from the fingers to the housing. With fingers positioned on both sides of the barrel portion 310 of the housing, the lateral forces form a couple which creates a torque. For example, in order for a thumb positioned as illustrated in FIG. 4B to counterbalance a counter-clockwise reaction torque from driving a screw, the user must first squeeze the thumb into the second side portion 312. This squeezing must result in enough friction to permit the thumb to apply a lateral force to the housing which will form part of a couple which in turn creates a clockwise torque to counterbalance the counter-clockwise reaction torque.

The necessary squeezing force is reduced due to the cradling of the thumb. With a substantial amount of contact surface on the side of the thumb, more of the lateral force can be directly transferred from the thumb to the housing, requiring less friction. Less squeezing force is necessary because less friction is necessary. As a result of the smaller squeezing force, hand fatigue that can accompany use of the drill/driver 300 is reduced. Because of the cradling of the thumb, the drill/driver will also feel more "responsive" to the user, i.e., the user will feel tactilely more able to make quick and precise movements with the drill/driver 300.

Figure 5A:
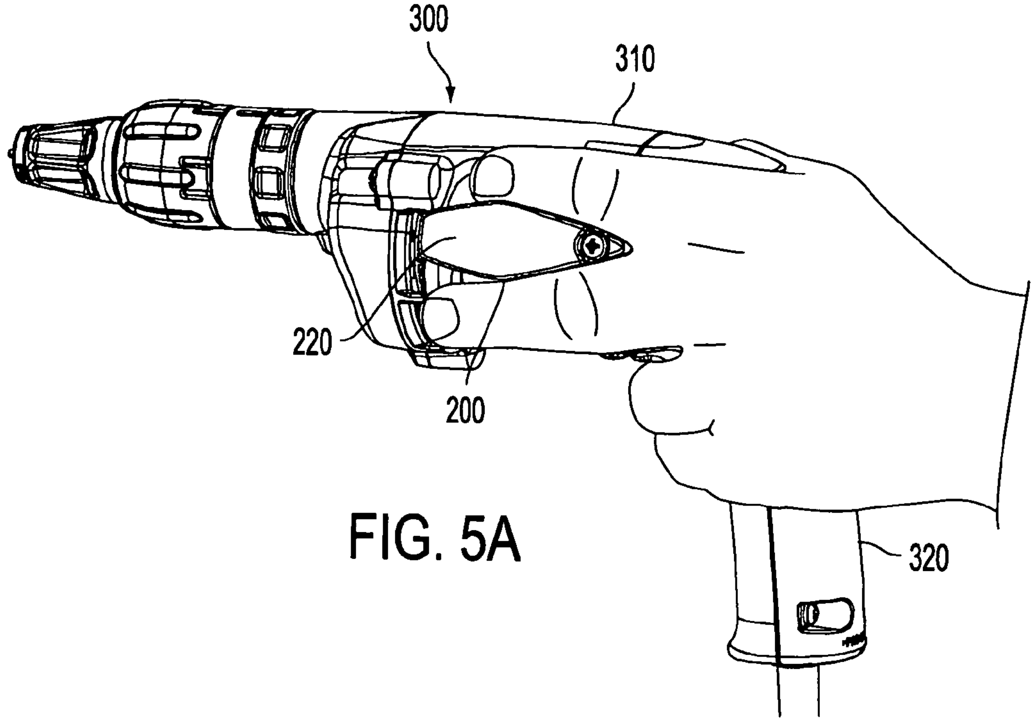
FIGS. 5A and 5B are isometric views of the drill/driver with the side-mounted belt clip grasped in the power-grip hold.
Figure 5B:
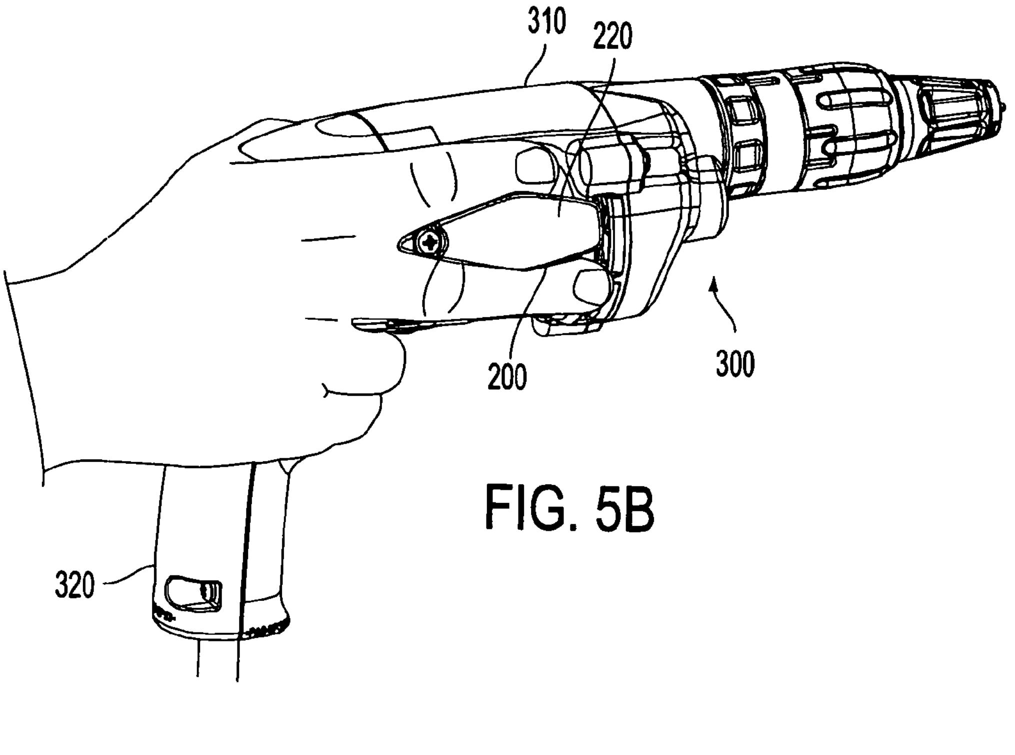

If desired, the side-mounted belt clip may be positioned to enable a power-grip hold illustrated in FIGS. 5A and 5B. In FIG. 5A, the belt clip 200 is mounted to the first side portion 311 of the drill/driver 300. In FIG. 5B, the belt clip 200 is mounted to the second side portion 312 of the drill/driver 300. In either configuration illustrated in FIGS. 5A and 5B, the user is able to grasp the drill/driver 300 with a single hand in the power-grip hold. In the power-grip hold, the thumb is positioned in contact with the side portion 311 or 312 which is opposite the belt clip 200. The first and second fingers are each positioned in contact with the other of the side surfaces 311 or 312 and the belt clip 200, with the first finger positioned on top of the belt clip 200 and the second finger positioned below the belt clip 200. The second web between the first and second fingers may also contact the belt clip 200. The remaining fingers are positioned in contact with either the side surface or the pistol grip portion 320. At least one of the remaining fingers can actuate the trigger switch 321 positioned on the barrel portion 320. Specifically, in FIGS. 5A and 5B the third and fourth fingers are in contact with the pistol grip portion 320 and can actuate the trigger switch 321.

The power-grip hold enables cradling of the first and second fingers in a manner similar to the cradling of the thumb in the thumb-rest hold. Fatigue associated with squeezing the drill/driver 300 will also be reduced in a similar manner, and the "responsiveness" will also similarly be improved. This hold especially gives the user a greater feeling of stability for the drill/driver 300.

As can be seen in FIGS. 4A, 4B, 5A, and 5B, the belt clip 200 can be positioned on the drill/driver 300 to enable both the thumb-rest and the power-grip holds. With the belt clip 200 mounted on the first side portion 311, the user can grasp the drill/driver 300 with the right hand in the thumb-rest hold (FIG. 4A) or with the left hand in the power-grip hold (FIG. 5A). With the belt clip 200 mounted on the second side portion 312, the user can grasp the drill/driver 300 with the right hand in the power-grip hold (FIG. 5B) or with the left hand in the thumb-rest hold (FIG. 4B). Thus, the belt clip 200 can be positioned on the drill/driver 300 for ambidextrous use.

With either the thumb-rest or the power-grip hold, the cradling of the fingers may be further enhanced through the inclusion of a finger groove 317. As shown in FIGS. 2A, 2C, 2D, and 2E, finger groove 317 may extend from first side portion 311 around to back side portion 313 and continue to second side portion 312. Alternatively, finger groove 317 may be formed discontinuously on the first and second side portions 311, 312 without extending across the back side portion 313. Finger groove 317 provides a depression in the housing which can help cradle the user's thumb and first finger when grasping the drill/driver 300. For either hold, it may also be advantageous to position the belt clip 200 on the drill/driver 300 so that while being grasped in the thumb-rest or the power-grip hold, the first web of the user's hand grasping the tool contacts the back side portion 316 at the finger groove 317.

When the finger groove 317 is included on the drill/driver 300, the belt clip 200 may be positioned so that the belt clip's surfaces effectively continue the shape of the finger groove 317, enlarging and enhancing the finger groove's effect of cradling the user's thumb and first finger.

Figure 2E:
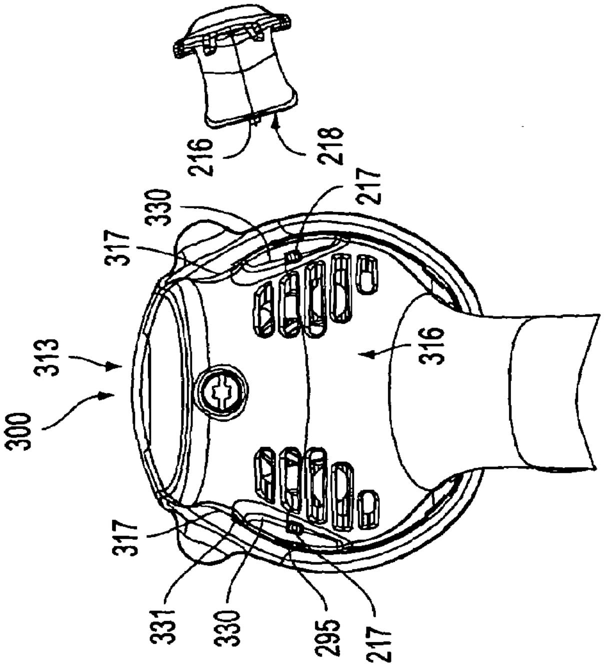
FIGS. 2D and 2E are rear views of the drill/driver in FIGS. 2A, 2B, and 2C showing the attachment of the belt clip to either side of the drill/driver.
Figure 2D:
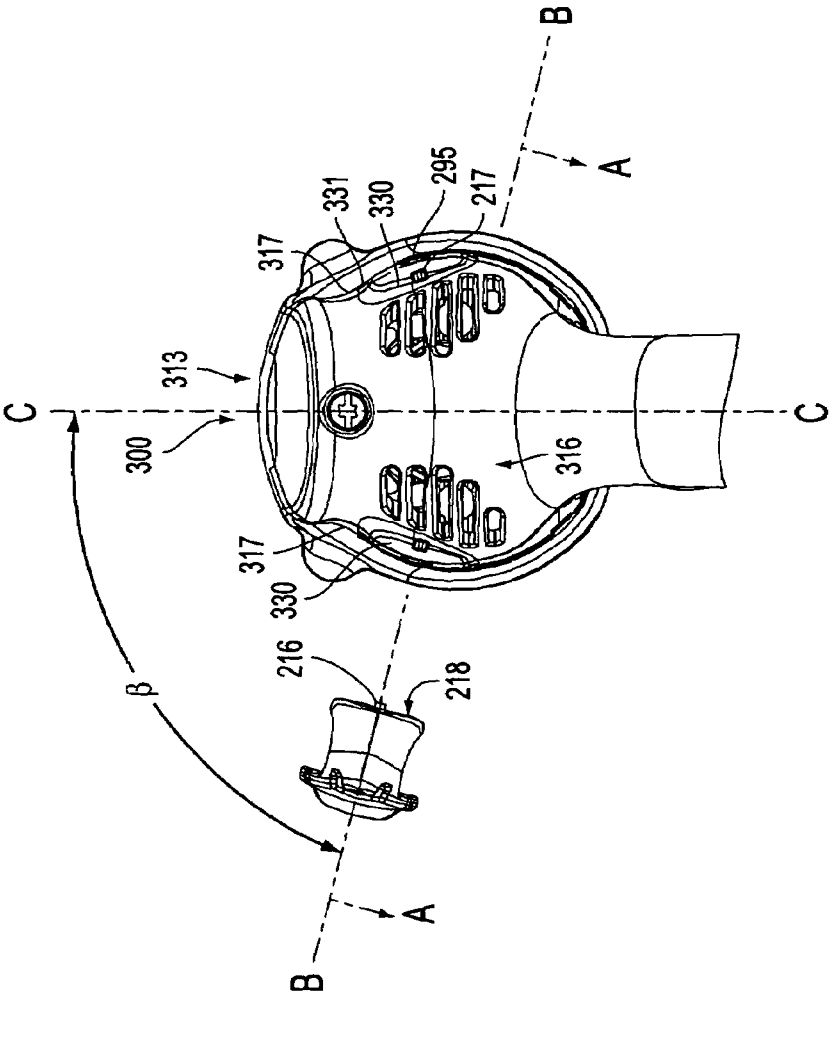
Figure 2F:
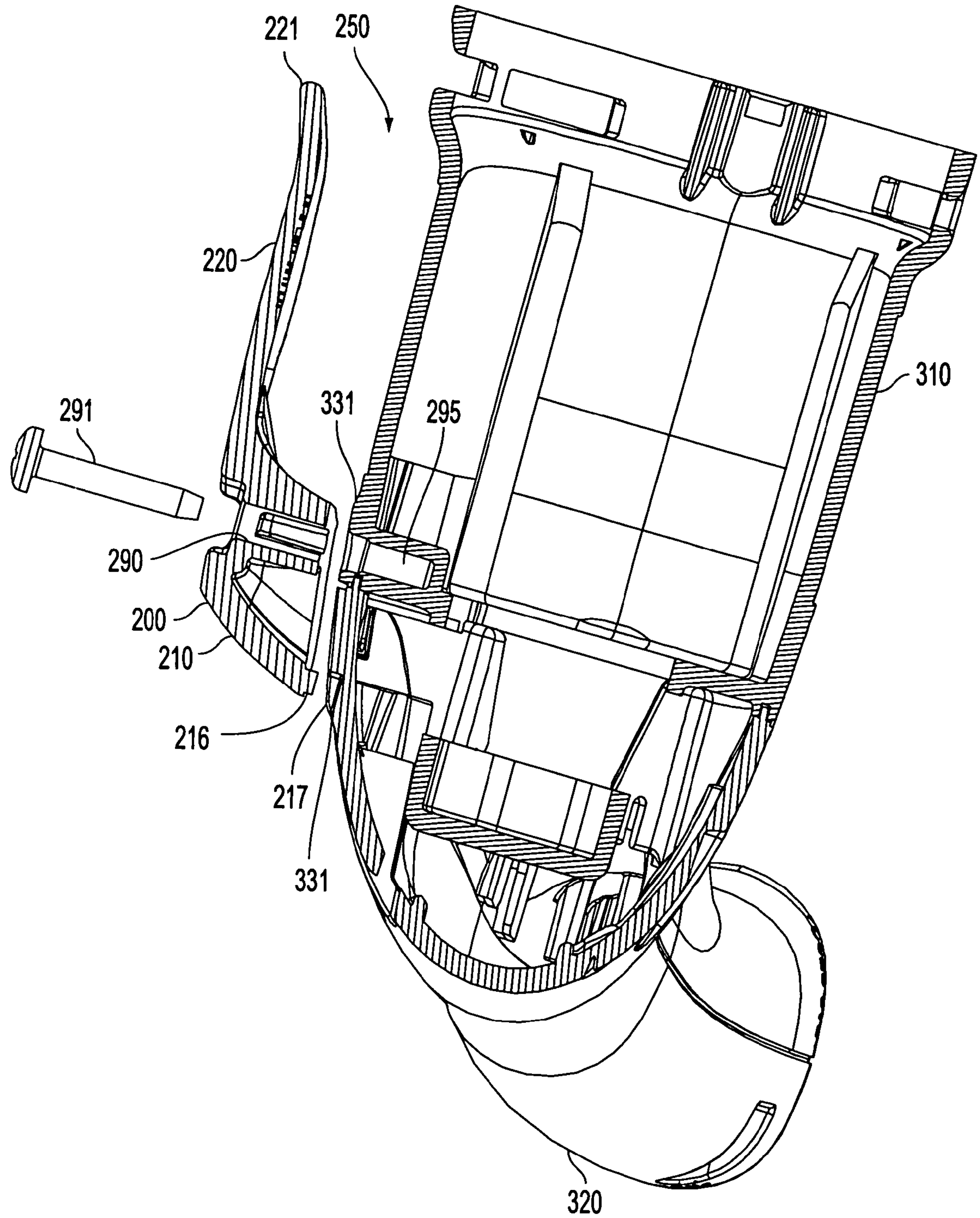
FIG. 2F is a sectional view of the drill/driver taken along line A—A of FIG. 2D showing the attachment of the belt clip to the side of the drill/driver.
Figure 6A:
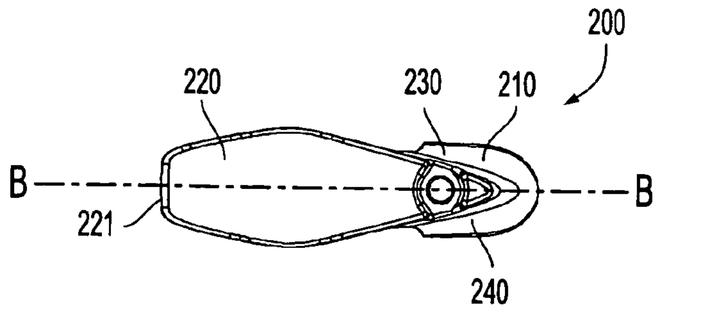
FIGS. 6A, 6B, 6C, and 6D illustrate side, top, rear, and isometric views, respectively, of a first preferred embodiment of the belt clip.
Figure 6B:
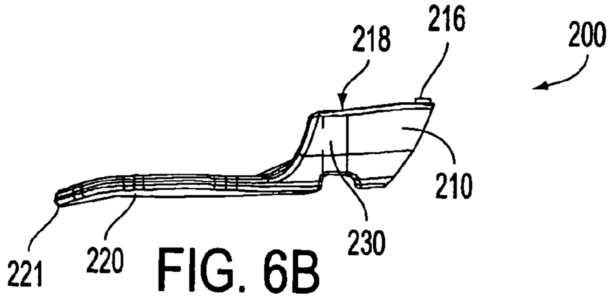
Figure 6C:
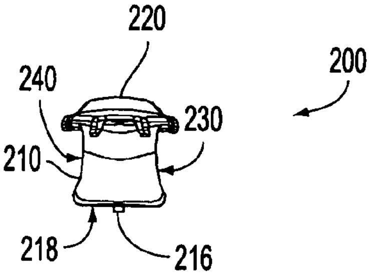
Figure 6D:
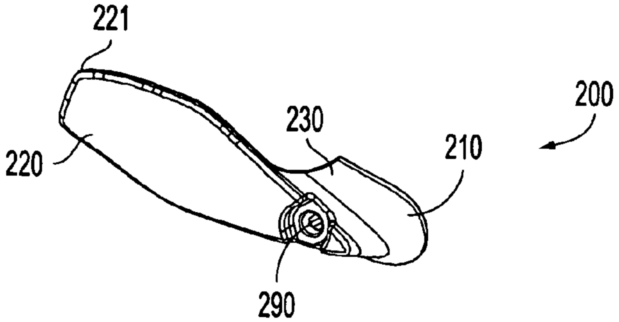

The angular position of the belt clip 200 on the first and second side portions 311 and 312 is illustrated in FIGS. 2D and 2E. An axis of symmetry of the drill/driver 300 is represented with a broken line C—C in FIG. 2D and also in FIG. 2B. The term axis of symmetry as used herein means that the features of the object are generally symmetrical on either side of the axis. Perfect symmetry is not necessary. An axis of symmetry of the belt clip is represented with a broken line B—B in FIG. 2D and also in FIG. 6A. The angular position β of the belt clip 200 is defined as the interior angle formed by the intersection of the axis of symmetry of the drill/driver 300 represented by line C—C and the axis of symmetry of the belt clip 200 represented by line B—B, as shown in FIG. 2D. In a preferred embodiment, β is preferably approximately 60° to 90°, or more preferably approximately 70° to 80°, or even more preferably approximately 75°.

The angular position β is partly dictated by the natural grasping position of the user's hand when grasping the drill/driver 300. As used herein, the term natural grasping position means a position in which a user's hand may grasp a tool so that the tool can be operated for its intended use, and a position of a user's hand for grasping the tool which an operator of ordinary skill in the art would naturally choose even if the operator was unfamiliar with the operation of the tool. The angular position β may be selected so that the user's first and second fingers will fit comfortably around the belt clip 200 in the power-grip hold. The angular position β may also be selected so that the user's thumb will rest comfortably on the top-facing surface of the belt clip 200 in the thumb-rest hold. Or, the angular position β may selected for facilitation of both the power-grip and thumb-rest holds, as in the illustrated embodiment.

The angular position β may also be affected by the position of the finger groove 317, if included on drill/driver 300. If desired, the angular position β may be selected so that the surfaces of the belt clip 200 can effectively continue the shape of the finger groove 317, enlarging and enhancing the finger groove's effect of cradling the user's thumb and first finger.

It is also possible to mount belt clip 200 to other portions of drill/driver 300. Likewise, when belt clip 200 is mounted to other tools, its position may be selected as desired.

Belt clip 200 may be selectively detachably mounted to a tool, if desired, so that the belt clip 200 can be removed when it is not needed or hampers the operation to be performed by the tool. In the illustrated embodiment, belt clip 200 is detachably mounted to drill/driver 300 by an attaching means. The attaching means can be any of a number of systems for selectively releasably securing the belt clip 200 to the surface of the tool. Examples of attaching means include a threaded recess formed in the housing for receiving a screw extending from the belt clip, a recess for receiving a biased snap attachment extension on the belt clip, a latch, a sliding joint, etc. Other appropriate attaching means may also be used, as will be recognized by those of skill in the art. Of course, if it is not desirable to have a detachable belt clip 200, the belt clip 200 may be permanently bonded to the housing by glue or the like. Or the belt clip 200 may be integrally formed as part of the housing. The term "mounted" as used herein includes items which are formed as separate pieces and permanently or selectively releasably held together, and items which are integrally formed together.

In the case of belt clip 200 used with drill/driver 300, it is especially advantageous to have the belt clip 200 detachably mounted. Drill/driver 300 is often used in tight positions where the protruding belt clip 200, even though its profile on the drill/driver 300 has been minimized, can encumber the operation. Thus, it may be necessary to remove the belt clip 200 in order to perform certain operations in very tight spaces.

In the illustrated embodiment, the attaching means comprises a fastener receiving recess 295 (FIG. 2F) formed in the housing of the drill/driver 300. A fastener 291 extends from a fastener hole 290 formed in the belt clip 200 and is received in the fastener receiving recess 295. To further prevent relative movement between the belt clip 200 and the drill/driver 300, an indexing tab 216 and an indexing tab receiving recess 217 may be formed on one or the other of the belt clip 200 and the drill/driver 300. Again, it should be emphasized that the attaching means is not limited to the means shown in the illustrated embodiment, but can be any of the other systems described above, or any other appropriate attaching means that will be recognized by those of skill in the art.

FIGS. 2D and 2E demonstrate how the belt clip 200 can be selectively detachably mounted by the user to the first or second side portion 311 or 312 of drill/driver 300. This may be accomplished by providing matching, symmetrical attaching means on both the first and second side portion 311, 312 of the drill/driver 300. Of course, more than two attaching means may be provided on drill/driver 300. Likewise, when belt clip 200 is used with other tools it may also be advantageous to provide multiple attaching means so that the belt clip 200 can be selectively attached to the tool in the location most convenient for the user. For example, right-handed and left-handed users may prefer different positions of belt clip 200 on a tool.

A raised pad 330 may be associated with the attaching means, if desired. Raised pad 330 may be formed integrally as part of the tool's housing and fastener receiving recess 295 may be formed on the raised pad 330. A tool mating surface 218 formed on the belt clip 200 may abut the raised pad 330 when the belt clip 200 is attached to the attaching means. The raised pad 330 is elevated above at least part of the housing of the tool immediately surrounding the raised pad 330, forming a lip 331 extending at least part way around the raised pad 330. The lip 331 can be contoured to match curves on the belt clip 200 and the tool housing for comfort. The lip 331 aids in the cradling of the user's thumb and fingers in the thumb-rest hold and power-grip hold.

The raised pad 330 provides a tactilely and visually recognizable identification of the attaching means to facilitate attachment of the belt clip 200 by the user.

When belt clip 200 is not attached to the tool, raised pad 330 still has utility as an aid in cradling the user's thumb or fingers. The lip 331 which extends at least partly around the raised pad 330 can aid in cradling the user's thumb or fingers because it extends away from the surface of the housing and provides an additional surface for the sides of the fingers or thumb to push on when wielding the tool.

When two attaching means and two associated raised pads 330 are provided on the first and second sides 311, 312 of a drill/driver 300, and a belt clip 200 is mounted to one of the attaching means, the other raised pad can be advantageously positioned to cradle the user's thumb or fingers on the side of the drill/driver 300 opposite the belt clip 200.

FIGS. 6A–6D illustrate a preferred embodiment of belt clip 200 for a hand-held power tool. Belt clip 200 may be fabricated as a single piece using conventional injection molding techniques. It may be comprised of any suitable plastic, such as polypropylene, high density polyethylene (HDPE), or the like. Other materials and manufacturing methods may also be used as will be recognized by those of skill in the art.

Belt clip 200 comprises a first projection 210 and a second projection 220. The first projection 210 forms a tool mating surface 218 at a first end whose profile may match the profile of the tool housing to which it will be mounted. If the belt clip 200 will be detachably mounted to the tool, the tool mating surface 218 may advantageously match the profile of the attaching means.

First projection 210 tapers outward from tool mating surface 218 to form first and second curved surfaces 230 and 240. First projection 210 has a second end for attaching the second projection 220. First projection 210 helps to space the second projection 220 away from the tool housing. Second projection 220 extends generally parallel to the tool housing to form the receiving recess 250 (see FIG. 2B). First and second projections 210, 220 can be formed as separate parts and can be permanently or semi-permanently fastened together. Or they may be formed as one unitary component, as illustrated in the figures. First and second projections 210, 220 can appear as generally distinctly curved, non-continuous formations, as illustrated in the figures, or each can be part of one mostly continuously curved formation. Preferably they are each mostly rigid, but could be made somewhat flexible as well.

A fastener hole 290 may be formed in the belt clip 200 as part of the attaching means to facilitate screw attachment of the belt clip 200 to the tool. Fastener hole 290 is recessed so that when attached to the tool, the fastener will not protrude from the surface of the belt clip 200.

The second projection 220 may include a lead-in 221 formed on the end thereof opposite the first projection 210. Lead-in 221 is a portion of the end of second projection 220 which is angled outwardly from the tool surface to facilitate holstering of the tool.

The first and second curved surfaces 230, 240 are ergonomically contoured to generally match the profile of the user's thumb and finger in order to comfortably cradle a thumb, a finger, or the webs of the user's hands which may contact the first or second curved surfaces 230, 240 and the corresponding surrounding tool housing. The curves of the first and second curved surfaces 230, 240 enhance the cradling which occurs during the thumb-rest hold and the power-grip hold. When used with the finger groove 317, at least one of the first and second curved surfaces 230, 240 can also be curved to continue, and enlarge and enhance the effect of, the finger groove 317. In addition, the intersection of the first and second curved surfaces 230, 240 adjacent to the back side portion 316 may be contoured to receive the second web of the user's hand.

Figure 7:
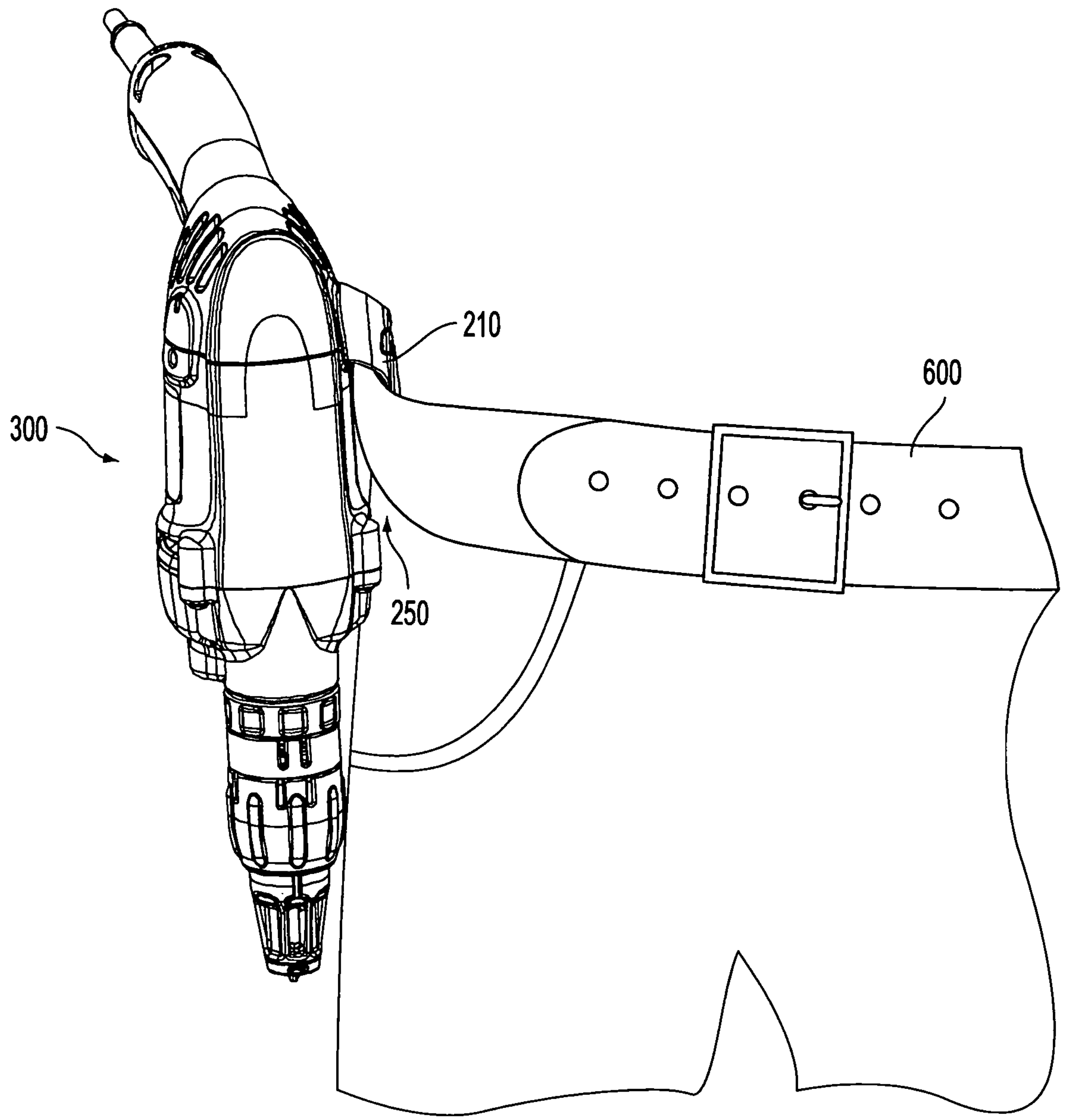
FIG. 7 is an illustration of a drill/driver conveniently fastened to a tool belt via the side-mounted belt clip

In addition to the belt clip's ability to provide an enhanced grip and greater feeling of stability when operating the tool, it also advantageously functions as an attachment means. Receiving space 250 is easily accessible to facilitate holstering of the tool by the belt clip 200. As seen in FIG. 7, the belt clip 200 can secure the tool to a tool belt 600. When the belt clip is side-mounted on a drill/driver 300, the user is not required to rotate his or her hand and arm excessively when holstering the drill/driver 300.

According to another aspect of the invention, a belt clip may be incorporated on a hand-held reciprocating saw. FIGS. 8 and 9 illustrate a reciprocating saw 400 with a belt clip 500. The clip 500 can be the same as the belt clip 200 illustrated in FIGS. 6A–6D, or can be chosen to better suit particular circumstances and needs or user preferences. The clip 500 permits the user of the reciprocating saw 400 to suspend the saw, when not in use, from a belt, belt loop, pants pocket, or any other accommodating surface or suitable receiving means.

The reciprocating saw 400 has a housing 410 including a handle portion 411, a motor portion 412, and a neck portion 413. The user typically grasps the reciprocating saw 400 by the handle portion 411 and the neck portion 413. The handle portion 411 includes a switch 420 for controlling a rotary motor (not shown). The rotary motor is generally mounted within the motor portion 412 of the housing. A reciprocating shaft extends out from the neck portion of the housing and mounts a blade holder 430. The reciprocating saw 400 has an axis of symmetry defined by a plane that approximately divides in half the handle portion 411, the motor portion 412, and the neck portion 413, the plane typically being parallel to the reciprocating shaft. The reciprocating saw 400 need not be perfectly symmetrical about the axis of symmetry. The axis of symmetry reflects a general symmetry on each side of the saw.

The clip 500 may be integrally formed with the housing 410 of the reciprocating saw 400, or the clip may be formed as a separate component and attached to the housing. If desired, the clip 500 can be attached to the housing in a manner that the user can detach and reattach the belt clip as desired.

As with the drill/driver 300, provision can be made for selective attachment of the clip 500 by the user at more than one location on the reciprocating saw 400. Two opposite mounting positions can be provided on either side of the reciprocating saw 400 for selective attachment of the clip 500 according to the preference of a right-handed or left-handed user or other circumstances. FIG. 8 illustrates the clip 500 mounted to the left side of the reciprocating saw 400, or the side of the reciprocating saw left of the axis of symmetry. FIG. 9 illustrates the clip 500 mounted to the right side of the reciprocating saw 400, or the side of the reciprocating saw right of the axis of symmetry. The two mounting positions can be selected so that they are approximately symmetrical about the axis of symmetry.

The clip 500 can be mounted anywhere on the reciprocating saw 400, as desired. FIGS. 8 and 9 illustrate the belt clip attached to the motor portion 412 of the housing 410. The belt clip could also be attached to the handle portion 411 or the neck portion 413.

The clip 500 can be attached to the reciprocating saw 400 with the same means as have been described with respect to the attachment of the belt clip 200 to a drill/driver 300. For example, the clip 500 could be attached to the reciprocating saw 400 with a threaded fastener 510 passing through the clip and attaching to the housing 410, and a projection or recess formed on the belt clip with a mating recess or projection formed on the housing for laterally holding the belt clip (see, e.g., FIG. 2F for a similar illustration of this structure included on the belt clip 200 and drill/driver 300).

Other embodiments, uses and advantages of the invention will be apparent to those skilled in the art from consideration of the specification and practice of the invention disclosed herein. The specification should be considered exemplary only, and the scope of the invention is accordingly intended to be defined by the following claims.

We claim:

1. A hand-held power tool comprising:

a housing;

at least a first attaching means for selectively detachably mounting a clip to the housing and a second attaching means for selectively detachably mounting a clip to the housing; and a clip for suspending the hand-held power tool from an accommodating surface when not in use, the clip selectively detachably mounted to the housing via either the first attaching means or the second attaching means, the clip capable of capturing the accommodating surface for suspending the hand-held power tool from the accommodating surface;

wherein the clip is selectively detachably mountable by a user to the housing at a first position through the use of the first attaching means and without the use of the second attaching means, and the clip is selectively detachably mountable by a user to the housing at a second position different from the first position through the use of the second attaching means and without the use of the first attaching means;

wherein the clip, comprises:

a tool mating surface; and a first projection extending outwardly from the tool mating surface at a first end, wherein the first projection has a concavely curved surface which is curved to generally fit the profile of a user's thumb and finger and which cradles the thumb or finger between the clip and the housing.

2. The hand-held power tool of claim 1 wherein each of the first attaching means and the second attaching means comprises:

a bore formed in the clip;

a bore formed in the housing a fastener passing through the bore in the clip and received in the bore formed in the housing;

an indexing projection extending from one of the housing or the clip; and an indexing projection receiving recess formed in the other of the housing or the clip which receives the indexing projection and laterally holds the indexing projection.

3. The hand-held power tool of claim 2 wherein the bore formed in the housing for the first attaching means is provided on a portion of the housing opposite from the bore formed in the housing for the second attaching means.

4. The hand-held power tool of claim 2 wherein the bore formed in the housing for the first attaching means is provided on a portion of the housing symmetrically opposite from the bore formed in the housing for the second attaching means.

5. The hand-held power tool of claim 1 wherein the clip is attached to the housing at each of the first position and the second position using no more than a single threaded fastener.

6. The hand-held power tool of claim 5 wherein the clip is detached from the housing at each of the first position and the second position by removing no more than a single threaded fastener from the housing.

7. The hand-held power tool of claim 6 wherein the clip is generally rigid and unitary in construction.

8. The hand-held power tool of claim 1 wherein the clip further comprises:

a second projection extending from a second end of the first projection creating a receiving space between the second projection and the housing.

9. A hand-held power tool comprising:

a housing having a fastener receiving recess;

a clip for suspending the hand-held power tool from an accommodating surface when not in use, the clip selectively detachably mounted to the housing through attachment of a clip fastener to the fastener receiving recess, the clip fastener being selectively detachable and reattachable by a user to the fastener receiving recess;

one of the clip or the housing having an indexing projection extending therefrom; and the other of the clip or the housing having an indexing projection receiving recess which receives the indexing projection and laterally holds the indexing projection;

wherein the clip comprises:

a tool mating surface; and a first projection extending outwardly from the tool mating surface at a first end, wherein the first projection has a concavely curved surface which is curved to generally fit the profile of a user's thumb and finger and which cradles the thumb or finger between the clip and the housing.

10. The hand-held power tool of claim 9 wherein the clip fastener is a threaded fastener and the fastener receiving recess is a bore in the housing.

11. The hand-held power tool of claim 10 wherein the clip is generally rigid and unitary in construction.

12. The hand-held power tool of claim 9 wherein the clip further comprises:

a second projection extending from a second end of the first projection creating a receiving space between the second projection and the housing.

13. A drill/driver comprising:

a housing with a barrel portion and a pistol grip portion, the barrel portion at least partially enclosing a rotary motor, the pistol grip portion having a switch which controls the rotary motor;

the housing having a central axis defined by a plane that approximately divides in half the barrel portion of the housing and the pistol grip portion of the housing with a first side of the housing on one side of the central axis and a second side of the housing on the other opposite side of the central axis;

a clip capable of suspending the drill/driver from a surface, the clip selectively detachably mountable by a user to the housing in at least two separate positions: a first position where the clip is on the first side of the housing and a second position where the clip is on the second side of the housing;

a first bore formed in the first side of the housing;

a first indexing protection receiving recess formed in the first side of the housing; and a pad formed on the housing with a perimeter that corresponds generally to a profile of the clip that is adjacent to the housing when the clip is attached to the housing, wherein the first bore and the first indexing projection receiving recess are each formed on the pad.

14. The drill/driver of claim 13 wherein:

the barrel portion has a top side portion, a bottom side portion generally opposite the top side portion, a first side portion, a second side portion generally opposite the first side portion, a front portion, and a back side portion generally opposite the front side portion, a chuck for holding a drill or screwdriver bit extending from the front side portion, the pistol grip portion being attached to the bottom side portion; and the first position is on the first side portion, and the second position is on the second side portion.

15. The drill/driver of claim 14 wherein:

the first side of the housing has a first attaching means for attaching the clip to the housing in the first position; and the second side of the housing has a second attaching means for attaching the clip to the housing in the second position.

16. The drill/driver of claim 14 wherein:

when the clip is mounted in the first position, the clip creates a receiving space between the clip and the first side of the housing for receiving a surface, and when the clip is mounted in the second position, the clip creates a receiving space between the clip and the second side of the housing for receiving a surface.

17. The drill/driver of claim 14 wherein:

the second position is approximately symmetrical about the central axis with the first position.

18. The drill/driver of claim 17 wherein:

when the clip is mounted in either of the first position or the second position, the clip is positioned closer to the back side portion of the barrel portion of the housing than to the front side portion.

19. The drill/driver of claim 18 wherein;

the clip has a bore for receiving a fastener which holds the clip on the housing; and one of the clip or the housing has an indexing projection extending therefrom, and the other of the clip or the housing has an indexing projection receiving recess which receives the indexing projection and holds the indexing projection laterally.

20. The drill/driver of claim 19 further comprising:

a fastener;

a second bore formed in the second side of the housing;

a second indexing projection receiving recess formed in the second side of the housing;

wherein the fastener passes through the bore in the clip and attaches to the first bore, and the indexing projection engages with the first indexing projection receiving recess to attach the clip to the housing in the first position; and wherein the fastener passes through the bore in the clip and attaches to the second bore, and the indexing projection engages with the second indexing projection receiving recess to attach the clip to the housing in the second position.

21. The drill/driver of claim 19 wherein the clip is generally rigid and unitary in construction.

22. The drill/driver of claim 21 wherein the clip is an injection-molded plastic component and comprises:

a tool mating surface;

a first projection extending at a first end from the tool mating surface and having a second end opposite the first end; and a second projection extending from the second end of the first projection, the second projection being spaced from the housing by the first projection when the clip is mounted to the housing.

23. The drill/driver of claim 13 wherein the pad is a raised pad.

24. A drill/driver comprising:

a housing with a barrel portion and a pistol grip portion, the barrel portion at least partially enclosing a rotary motor, the pistol grip portion having a switch which controls the rotary motor;

the housing having a central axis defined by a plane that approximately divides in half the barrel portion of the housing and the pistol grip portion of the housing with a first side of the housing on one side of the central axis and a second side of the housing on the other opposite side of the central axis;

a means for holding the drill/driver from a surface when the drill/drive is not in use, the means for holding selectively detachably mountable by a user to the housing in at least two separate positions: a first position where the means for holding is on the first side of the housing and a second position where the means for holding is on the second side of the housing;

a first bore formed in the first side of the housing;

a first indexing projection receiving recess formed in the first side of the housing; and a pad formed op the housing with a perimeter that corresponds generally to a profile of the means for holding that is adjacent to the housing when the means for holding is attached to the housing, wherein the first bore and the first indexing projection receiving recess are each formed on the pad.

25. The drill/driver of claim 24 wherein:

the barrel portion has a top side portion, a bottom side portion generally opposite the top side portion, a first side portion, a second side portion generally opposite the first side portion, a front portion, and a back side portion generally opposite the front side portion, a chuck for holding a drill or screwdriver bit extending from the front side portion, the pistol grip portion being attached to the bottom side portion; and the first position is on the first side portion, and the second position is on the second side portion.

26. The drill/driver of claim 25 wherein:

when the means for holding is mounted in the first position, the means for holding creates a receiving space between the means for holding and the first side of the housing for receiving a surface, and when the means for holding is mounted in the second position, the means for holding creates a receiving space between the means for holding and the second side of the housing for receiving a surface.

27. The drill/driver of claim 25 wherein:

the second position is approximately symmetrical about the central axis with the first position.

28. The drill/driver of claim 27 wherein when the means for holding is mounted in either of the first position or the second position, the means for holding is positioned closer to the back side portion of the barrel portion of the housing than to the front side portion.

29. The drill/driver of claim 28 wherein:

the means for holding has a bore for receiving a fastener which holds the means for holding on the housing; and one of the means for holding or the housing has an indexing projection extending therefrom, and the other of the means for holding or the housing has an indexing projection receiving recess which receives the indexing projection and holds the indexing projection laterally.

30. The drill/driver of claim 29 further comprising:

a fastener;

a second bore formed in the second side of the housing;

a second indexing projection receiving recess formed in the second side of the housing;

wherein the fastener passes through the bore in the means for holding and attaches to the first bore, and the indexing projection engages with the first indexing projection receiving recess to attach the means for holding to the housing in the first position; and wherein the fastener passes through the bore in the means for holding and attaches to the second bore, and the indexing projection engages with the second indexing projection receiving recess to attach the means for holding to the housing in the second position.

31. The drill/driver of claim 29 wherein the means for holding is generally rigid and unitary in construction.

32. The drill/driver of claim 24 wherein the pad is a raised pad.

* * * * *